United States Patent [19]
Davila et al.

[11] Patent Number: 6,007,605
[45] Date of Patent: Dec. 28, 1999

[54] INTEGRATED EXCLUSION FILTER AND PRESSURIZING MEANS

[75] Inventors: Marco A. Davila, Mesquite; Edward C. Fontana, Rockwall; Daniel M. Kolides, Mesquite, all of Tex.; Joyce E. Lingousky, Annandale, N.J.

[73] Assignee: Lucent Technologies, Inc., Muray Hill, N.J.

[21] Appl. No.: 09/020,721

[22] Filed: Feb. 9, 1998

[51] Int. Cl.[6] .................................................. B01D 45/14
[52] U.S. Cl. ................................. 95/35; 95/270; 55/406; 55/409; 55/467
[58] Field of Search ............................. 55/400, 403, 404, 55/406, 407, 408, 409, 410, 467, 472, 485, 482, 484, 306; 95/35, 270; 210/512.3, 787, 360.1

[56] References Cited

U.S. PATENT DOCUMENTS

| | | | |
|---|---|---|---|
| 3,260,039 | 7/1966 | Brown et al. | 55/426 |
| 4,118,207 | 10/1978 | Wilhelm | 55/406 |
| 4,975,188 | 12/1990 | Brunsell et al. | 210/324 |
| 5,746,789 | 5/1998 | Wright et al. | 55/306 |

OTHER PUBLICATIONS

"Self–Cleaning, High–Efficiency Dynamic Particle Exclusion Filter", by Steve R. Wright, et al., American Filtration & Separations Society, 1996, pp. 68–73.

*Primary Examiner*—David A. Simmons
*Assistant Examiner*—Robert A. Hopkins
*Attorney, Agent, or Firm*—Locke Liddell & Sapp LLP

[57] ABSTRACT

There is provided an integrated exclusion filter and pressurizing device which prevents leakage of unfiltered fluid across the interface area between a rotating filtering apparatus and non-rotating bulkhead. The exclusion filter utilized is of the type which utilizes Boundary Layer Momentum Transfer methodology to achieve filtration, and which includes a cylindrical stack of substantially flat annular plates. A pressurizing device is utilized downstream from the exclusion filter to repressurize filtered fluid and direct the filtered fluid toward the interface area. Either all the filtered fluid or only a portion may be repressurized, and some of the filtered fluid may be directed toward the bulkhead itself to aid pressurization by creating a local stagnation region. The pressurizing device may utilize flow diverting blades in a housing, including blowers, pumps, compressors, and fans. The housing design may be modified to improve fluid flow and multistage pressurizing means designs may be used to enhance repressurization. External vanes may also be added to the filtering apparatus to disperse particles ejected by the exclusion filter, reduce the particle density of the unfiltered fluid surrounding the exclusion filter, cool the system served by the filtering apparatus, or dilute the exhaust of the system served by the filtering apparatus.

43 Claims, 9 Drawing Sheets

INTEGRATED EXCLUSION FILTER AND
PRESSURIZING MEANS

TECHNICAL FIELD OF THE INVENTION

This invention relates to particulate filters, and more importantly, is concerned with a filtering apparatus containing a mechanism for preventing leakage of unfiltered fluid around the periphery of an exclusion filter.

BACKGROUND OF THE INVENTION

The removal of particulates from working or moving fluids is vital to the prevention of the fouling or erosion of heat, mass and momentum transfer surfaces. In the particular case of electronics enclosures, contaminants in the cooling airflow may foul heat sinks and prevent proper cooling of electronic components. In the past, working and moving fluids were either sealed in a closed environment and, if necessary, cooled by the use of heat exchangers, or conventional screening filters were employed. Conventional filters require periodic maintenance, however, and heat exchangers are relatively expensive. An affordable, maintenance-free, self-cleaning filter system represents an appealing solution to the problem of particulate contamination.

Exclusion filters are a relatively new development in the field of particulate filtration. Exclusion filters utilize a cylindrical stack of evenly-spaced flat annular disks which rotates about the stack's central axis. The stack is capped on one end, and the disk's concentric holes form a central core within the stack. When operating, fluid pressure is reduced within the core and unfiltered fluid enters the rotating stack's periphery though the spaces between the disks. The fluid exits the stack through the uncapped end of the central core. Exclusion filters operate on Boundary Layer Momentum Transfer methodology. The rotation of the disks establishes a boundary layer on each side of each disk in the stack. A pressure drop across the disk stack (from outer to inner perimeter) is caused by the frictional drag losses of outside fluid traversing the boundary layers between the disks. Angular momentum transfer from the rotating disks via the inter-disk boundary layers in the device causes any particles above the critical cut-off size that are entrained in the incoming fluid to be immediately expelled away from the device perimeter. The fluid itself passes easily through the device. Exclusion filters are capable of filtering particulates and liquid droplets from a gas, or of filtering particulates from a liquid.

Prior exclusion filter systems have suffered from leakage problems. Specifically, in prior exclusion filter systems unfiltered fluid has a tendency to leak into and contaminate previously filtered fluid by way of the interface area between the rotating exclusion filter and the non-rotating bulkhead which separates the filtered fluid from the unfiltered fluid. This leakage of unfiltered fluid also contributes to the deterioration of sealing measures which may be located within the interface area, to the binding of bearings in the interface area, and to the general fouling and clogging of the interface area. Properly functioning exclusion filter systems represent an affordable, maintenance free, and self-cleaning alternative to existing filter systems, and could be used to remove particles from a moving or working fluids. A need exists for a properly functioning exclusion filter system which does not suffer from such leakage problems.

SUMMARY OF THE INVENTION

The present invention provides an integrated exclusion filter and pressurizing means which meets the aforementioned need. The filtering apparatus functions by adding a pressurizing system to the exclusion filter, which repressurizes filtered fluid and directs the repressurized fluid toward the interface area between the rotating filtering apparatus and the non-rotating bulkhead which separates the filtered and unfiltered fluids. The repressurized and redirected filtered fluid in turn pressurizes the interface area to a pressure equal to or greater than the pressure experienced by the unfiltered fluid within the unfiltered fluid reservoir adjacent to the interface area. This pressurization of the interface area ensures that any leakage experienced across the interface area will be of filtered fluid into the unfiltered side of the bulkhead, and not of unfiltered fluid into the filtered side of the bulkhead. The filtering apparatus can be used in conjunction with additional sealing measures, thus reducing the leakage of filtered material to the unfiltered side of the bulkhead. External fluid guides may also be used to help direct the discharge of the pressurizing means toward the interface area.

Acceptable pressurizing means for use in the filtering apparatus include pumps, compressors, blowers, or fans. In a preferred embodiment, a centrifugal blower is mounted coaxially with and downstream from the exclusion filter. The centrifugal blower accepts filtered fluid from the exclusion filter, repressurizes the fluid, and ejects it radially through the sides of the blower. The design of the centrifugal blower may be improved to reduce head loss through the filtering apparatus.

The interface area may be pressurized by one of, or a combination of, three methods. The pressurizing means may repressurize all filtered fluid received from the exclusion filter and direct the filtered fluid towards the interface area. Alternatively, the pressurizing means may divert a fraction of the filtered fluid received from the exclusion filter, repressurize the diverted flow, and direct the divert flow toward the interface area. Finally, the pressurizing means may direct the repressurized filtered fluid toward the inner surface of the bulkhead orifice, thereby producing a local stagnation region to reduce the repressurization of the filtered fluid required to produce the desired pressure within the interface area.

The filtering apparatus may be an active or a passive system, and may utilize multistage pressurizing means. External vanes may also be added to the filtering apparatus within the unfiltered fluid reservoir to dilute the exhaust of the system served by the filtering apparatus, to disperse particles ejected by the exclusion filter and reduce the particle density of the unfiltered fluid in the area surrounding the exclusion filter, and to stimulate airflow across the exterior of the system served by the filtering apparatus.

Several advantages are realized by the integrated exclusion filter and pressurizing means of the present invention. The integration of a pressurizing means transforms an exclusion filter into a far more effective filtering system by eliminating a serious leakage problem. The combined filtering apparatus then offers an affordable, maintenance-free, and self-cleaning alternative to existing filtering systems. The integration of a pressurizing means can also eliminate the need for a separate pressurizing or mass flow producing means within the system served by the filtering apparatus.

BRIEF DESCRIPTION OF THE DRAWINGS

For a more complete understanding of the present invention, and the advantages thereof, reference is now made to the following Detailed Description of the Invention taken in conjunction with the accompanying drawings in which.

DETAILED DESCRIPTION OF THE INVENTION

Figure 1:
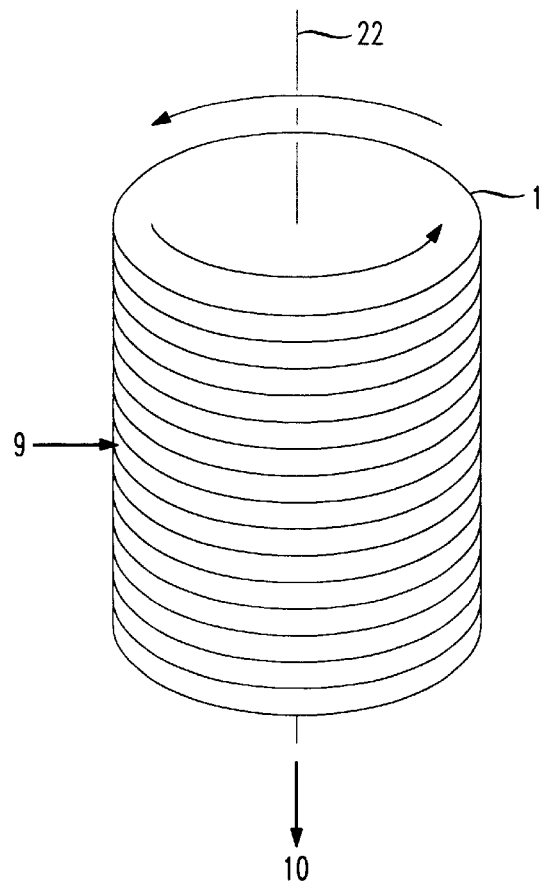
FIG. 1 is a perspective view of an exclusion filter of the prior art.

The present invention and its advantages are best understood by referring to the drawings, like numerals being used for like and corresponding parts of the various drawings.

Figure 2:
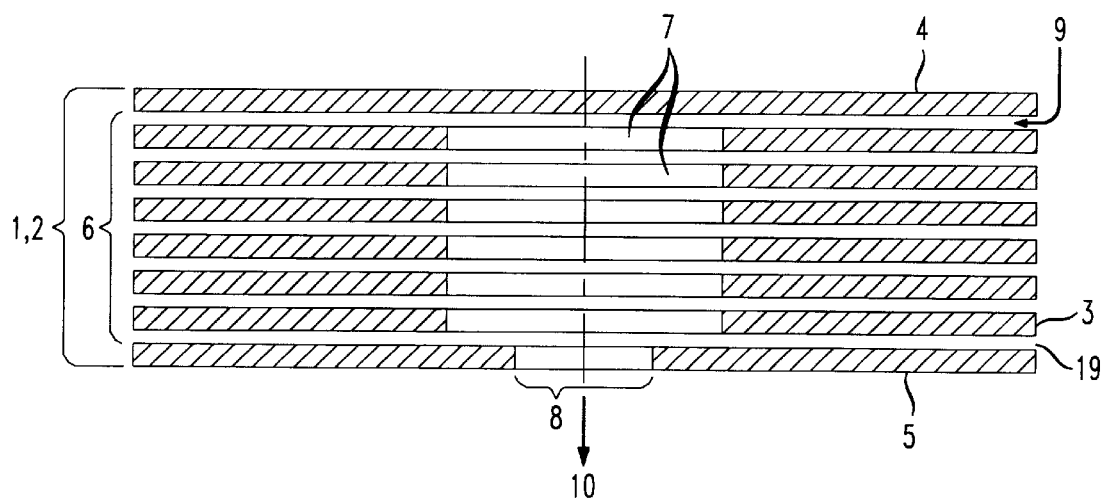
FIG. 2 is a cross section of an exclusion filter of the prior art.

In FIGS. 1 and 2 there is shown an existing design for an exclusion filter 1. Exclusion filter 1 includes a cylindrical stack 2 of evenly spaced flat annular disks 3, a capped end 4 and an orifice end 5, a central core 6 formed by the central holes 7 of the disks 3, the orifice end 5 containing a filter orifice 8. When operating the filter is rotated about its central axis 22, and unfiltered fluid 9 enters the rotating stack 2 through the inlet spaces 19 between disks 3. Filtered fluid 10 then flows into central core 6, and exits stack 2 through filter orifice 8.

Figure 3:
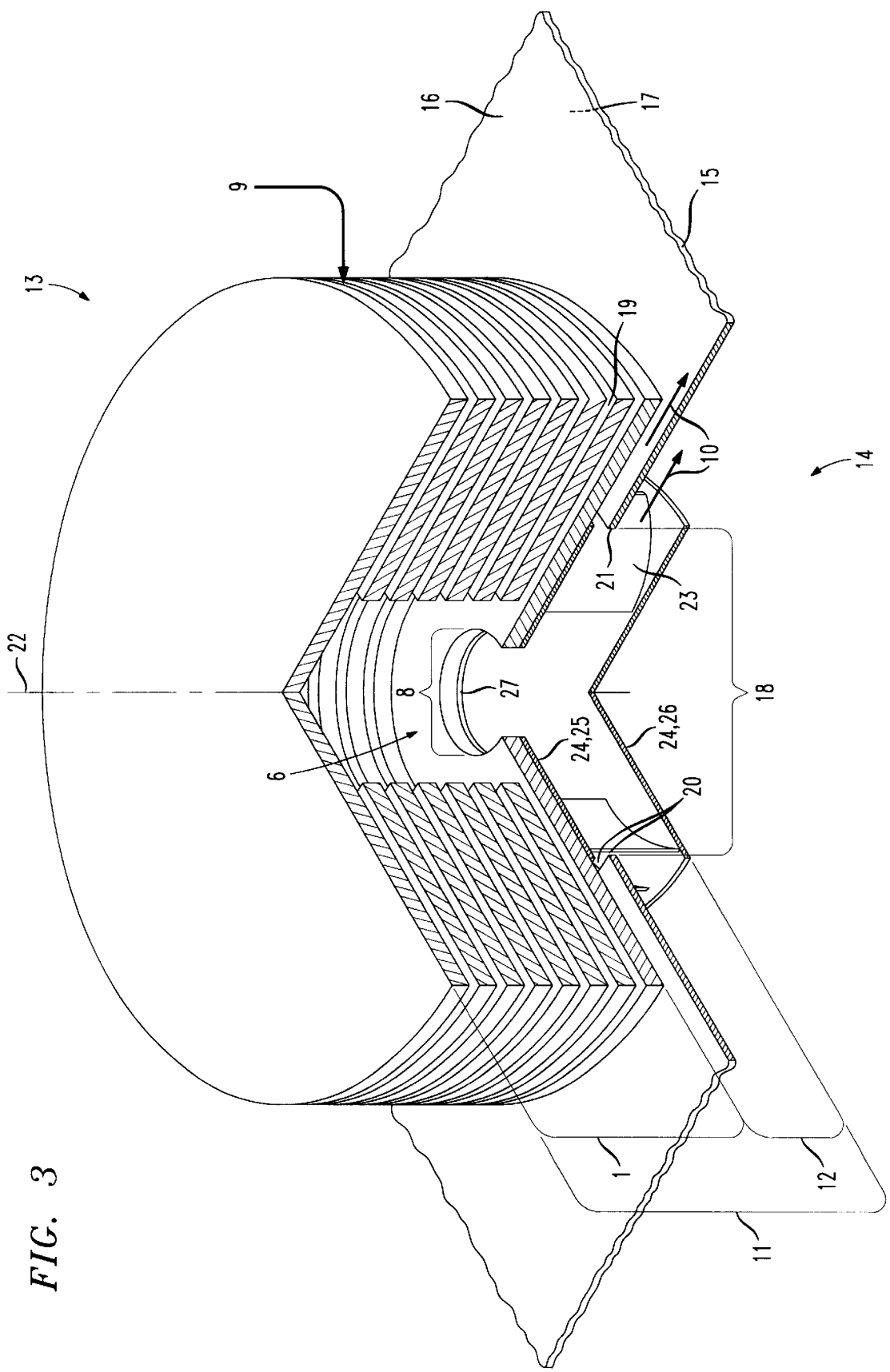
FIG. 3 is a perspective view of the filtering apparatus of the present invention, illustrating a filtering apparatus within an expected working environment, highlighting the seal/bearing failure region.

In FIG. 3 there is shown an integrated exclusion filter and pressurizing means of the present invention, generally designated 11 and hereinafter referred to as the filtering apparatus. Filtering apparatus 11 includes an exclusion filter I and a pressurizing means 12.

The environment in which filtering apparatus 11 operates includes an unfiltered fluid reservoir 13, a filtered fluid reservoir 14, and a bulkhead 15, which separates unfiltered fluid reservoir 13 from filtered fluid reservoir 14. Unfiltered fluid reservoir 13 and filtered fluid reservoir 14 need not be clearly defined or enclosed areas. One reservoir may be an open area, such as the atmosphere or a body of water. Bulkhead 15 is any structure designed to separate unfiltered fluid reservoir 13 and its contents from filtered fluid reservoir 14 and its contents. Though bulkhead 15 is illustrated in FIG. 3 as a flat plate, it is to be understood that other bulkhead 15 designs are equally acceptable for use with this invention. The upstream bulkhead surface 16 is the surface of bulkhead 15 which contacts unfiltered fluid reservoir 13. The downstream bulkhead surface 17 is the surface of bullhead 15 which contacts filtered fluid reservoir 14. Bulkhead 15 contains a bulkhead orifice 18. The inner surface 21 of bulkhead orifice 18 is the surface of bulkhead 15 between downstream bulkhead surface 17 and upstream bulkhead surface 16 contacting bulkhead orifice 18. Filtering apparatus 11 is positioned within bulkhead orifice 18, such that all inlet spaces 19 are located within unfiltered fluid reservoir 13 and filtered fluid 10 is discharged by pressurizing means 12 at least primarily into filtered fluid reservoir 14. The interface area 20 is the area between filtering apparatus 11 and bulkhead 15. Bulkhead orifice 18 should be designed to limit the size of interface area 20 as greatly as possible. Interface area 20 may contain sealing mechanisms and bearing mechanisms.

Figure 4:
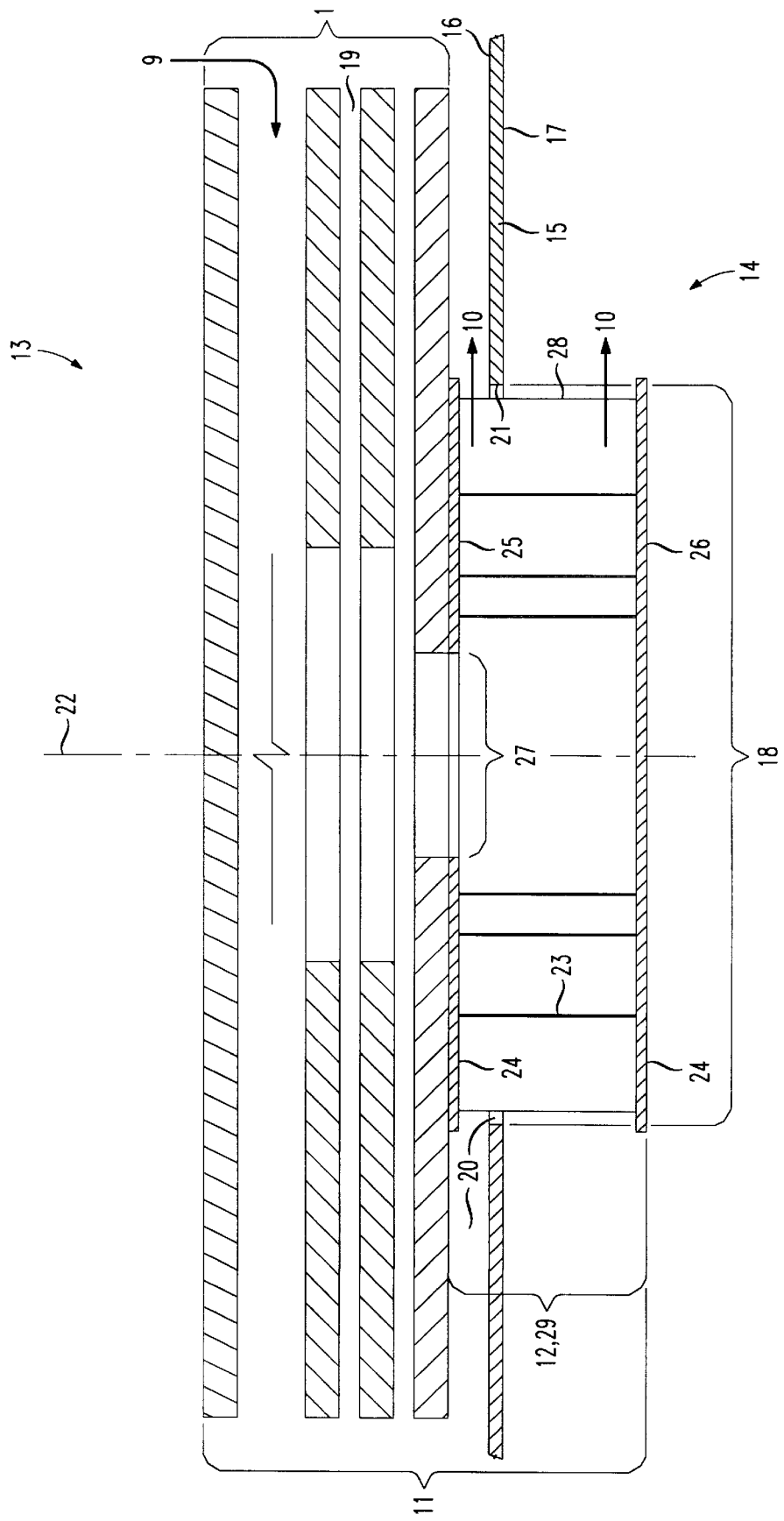
FIG. 4 is a cross section of a filtering apparatus utilizing a "squirrel cage" centrifugal blower and one method of pressurizing the interface area.

FIG. 4 illustrates one example of the interface between filtering apparatus 11 and bulkhead 15, in which bulkhead orifice 18 is substantially cylindrical in shape and central axis of bulkhead orifice 18 is substantially co-linear with axis of rotation 22 of filtering apparatus 11. It is to be understood that the design of bulkhead orifice 18 and the orientation of filtering apparatus 11 illustrated in FIGS. 4 through 10 are merely exemplary in nature, and that other orientations and designs may be used.

Pressurizing means 12 includes flow diverting vanes 23 in a housing 24 located downstream from exclusion filter 1. Pumps, compressors, fans, turbines, and blowers are examples of acceptable pressurizing means, though it is to be understood that other pressurizing means would also be acceptable. Several different housing 24 arrangements are acceptable. Housing 24 may be immediately downstream from exclusion filter 1 but of completely separate construction. Housing 24 may be further downstream from exclusion filter 1 and be connected to exclusion filter 1 by an extension. When using an extension, exclusion filter 1 discharges filtered fluid 10 into the extension, which in turn discharges filtered fluid 10 into housing 24. Housing 24 may also be directly integrated into exclusion filter 1. When directly integrated, either housing 24 or flow diverting vanes 23 are attached directly to the exclusion filter 1, and portions of the exclusion filter 1 may also serve as portions of housing 24. Finally, portions of non-rotating bulkhead 15, or non-rotating attachments to bulkhead 15, may serve as portions of housing 24.

In FIG. 4 there is shown one example of the preferred pressurizing means 12, a centrifugal blower. The centrifugal blower is shown mounted immediately downstream from the exclusion filter 1. In this preferred embodiment flow diverting vanes 23 are mounted co-axially with exclusion filter 1, thereby permitting the same driving means to rotate both the exclusion filter 1 and flow diverting vanes 23. The driving means producing the rotation may advantageously be an element already existing in the system being served by filtering apparatus 11, such as a rotating drive-shaft. It is to be understood, however, that this invention does not require pressurizing means 12 to be mounted co-axially with exclusion filter 1, and that the rotation of flow diverting vanes 23 may be produced by a driving means other than the driving means utilized by exclusion filter 1. The centrifugal blower housing 24 has an upstream wall 25 and a downstream wall 26. The upstream wall 25 contains a blower orifice 27 through which to receive filtered fluid 10 from the exclusion filter. Repressurized filtered fluid 10 is ejected radially by the centrifugal blower and exits the centrifugal blower through its sides 28. The type of centrifugal blower illustrated in FIG. 4 is a "squirrel cage" centrifugal blower 29, with substantially flat upstream wall 25 and downstream wall 26. The design of the centrifugal blower may be improved by modifying upstream wall 25 of the centrifugal blower into a concave frusticone shape, with the narrow end of the frusticone containing blower orifice 27. The design may also be improved by modifying downstream wall 26 to include a central peak extending toward blower orifice 27. Acceptable improved blower designs may be chosen from the group comprising: designs incorporating modified upstream walls 25, designs incorporating modified downstream walls 26, and designs incorporating both modified upstream walls 25 and downstream walls 26. The improved design improves blower performance by reducing the pressure loss experienced through the blower due to the formerly abrupt 90 degree turn experienced by filtered fluid 10 upon entering blower orifice 27. It is to be understood that the improved shape of the centrifugal blower design may be achieved by either forming downstream wall 26 and upstream wall 25 in the desired shapes, or by attaching elements to downstream wall 26 and upstream wall 25 so that the combination forms the desired shape. An improved housing 24 design similar to the improved blower design may be utilized with other pressurizing means 12.

One primary purpose of pressurizing means 12 is the prevention of downstream leakage. Downstream leakage is leakage of unfiltered fluid 9 from unfiltered fluid reservoir 13 to filtered fluid reservoir 14, by way of interface area 20. The reason fluid flows from unfiltered fluid reservoir 13 to filtered fluid reservoir 14 is that the pressure experienced by unfiltered fluid 9 within unfiltered fluid reservoir 13 is higher than the pressure experienced by filtered fluid 10 within filtered fluid reservoir 14. The same pressure differential normally ensures that any leakage across interface area 20 is downstream leakage, which impairs the effectiveness of exclusion filter 1, promotes deterioration of sealing mechanisms within interface area 20, and increasing the likelihood of binding and fouling of bearings within interface area 20.

Pressurizing means 12 achieves its purpose by repressurizing filtered fluid 10 and directing the repressurized filtered fluid 10 towards interface area 20, thereby pressurizing interface area 20 to a pressure at least as great as that experienced in unfiltered fluid reservoir 13 immediately adjacent to interface area 20. This pressurization of interface area 20 advantageously ensures that any leakage experienced across interface area 20 will be upstream leakage. Upstream leakage is leakage of filtered fluid 10 from filtered fluid reservoir 14 to unfiltered fluid reservoir 13, by way of interface area 20. Limiting leakage to upstream leakage also advantageously reduces the deterioration of sealing mechanisms within interface area 20 and helps prevent binding and fouling of bearings within interface area 20.

The present invention modifies the pressure arrangement in one of three methods. In the first method pressurizing means 12 repressurizes all filtered fluid 10 as it is received from exclusion filter 1, and directs part or all of the repressurized filtered fluid 10 toward interface area 20. In the second method pressurizing means 12 diverts a fraction of filtered fluid 10 as it is received from exclusion filter 1, repressurizes the diverted filtered fluid 10, and directs the repressurized filtered fluid 10 toward interface area 20. The third method may be used in conjunction with either of the first two methods, and reduces the repressurization of filtered fluid 10 that is required to achieve the desired pressure at interface area 20. In the third method filtering apparatus 11 is positioned in bulkhead orifice 18 so that the plane formed by the outer perimeter 30 of the downstream surface 31 of upstream wall 25 of housing 24 intersects bulkhead 15 between upstream bulkhead surface 16 and downstream bulkhead surface 17. At least a fraction of the discharge from pressurizing means 12 is then directed against inner surface 21 of bulkhead orifice 18, and the resulting local stagnation region increases the effective pressure experienced within interface area 20.

All three methods may be used in conjunction with additional sealing measures, thereby reducing upstream leakage. Flat seals, brush seals, and bearing seals are among the sealing measures which may be utilized. When a seal 32 is utilized, it should engage bulkhead 15 and filtering apparatus 11, and the point of engagement 33 on filtering apparatus 11 should be between inlet spaces 19 and the discharge of pressurizing means 12. Such additional sealing measures are not required in all embodiments of the present invention, however, and it should be understood that the presence or absence of additional sealing measures is not a requirement of the invention.

External fluid guides 34, or those devices designed to channel filtered fluid 10 which are not internal to pressurization means 12, may also be used to help channel the discharge from pressurizing means 12 toward interface area 20. External fluid guides 34 may be attached to the rotating filtering apparatus 11, part of bulkhead 15, or attached to bulkhead 15. External fluid guides are not required in all embodiments of the present invention, however, and it should be understood that the presence or absence of external fluid guides 34 is not a requirement of the invention.

In FIG. 4 there is shown an embodiment of the first method of interface area 20 pressurization, in which pressurizing means 12 repressurizes all filtered fluid 10 as it is received from exclusion filter 1, and directs part or all of the repressurized filtered fluid 10 toward interface area 20. Specifically, a filtering apparatus 11 is illustrated which utilizes a "squirrel cage" centrifugal blower 29 and no additional sealing measures. The centrifugal blower repressurizes all filtered fluid 10 received from exclusion filter I and ejects filtered fluid 10 radially toward interface area 20. The filtering apparatus 11 is positioned so that the centrifugal blower discharges a fraction of the repressurized filtered fluid 10 upstream from interface area 20, and the remainder of filtered fluid 10 downstream from interface area 20. In such an arrangement the fraction of filtered fluid 10 ejected upstream from interface area 20 should be reduced as greatly as possible to improve the efficiency of filtering apparatus 11. It should be understood that other arrangements are possible in which the entirety of filtered fluid 10 is initially discharged downstream from the bulkhead, and that the present invention does not require the specific arrangement illustrated in FIG. 4.

Figure 5:
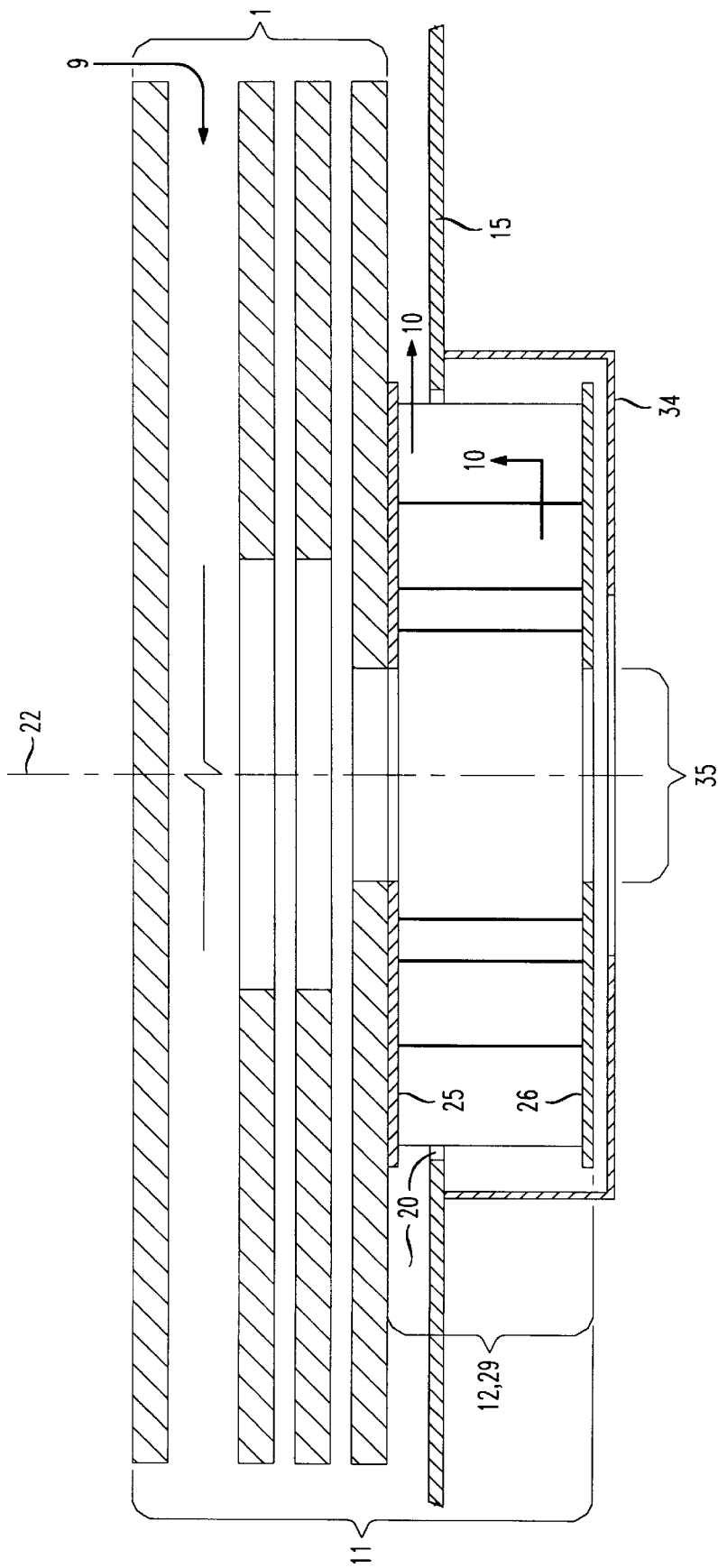
FIG. 5 is a cross section of a filtering apparatus utilizing a modified "squirrel cage" centrifugal blower and an alternate method of pressurizing the interface area.

In FIG. 5 there is shown an embodiment of the second method of interface area 20 pressurization, in which pressurizing means 12 diverts a fraction of filtered fluid 10 as it is received from exclusion filter 1, repressurizes the diverted filtered fluid 10, and directs the repressurized filtered fluid 10 toward interface area 20. Specifically, a filtering apparatus 11 is illustrated which utilizes a modified "squirrel cage" centrifugal blower 29 containing an outlet orifice 35 in downstream wall 26 to allow a fraction of filtered fluid 10 to pass through pressurizing means 12 without substantial repressurization. Note that blower designs incorporating outlet orifice 35 may not be compatible with improved blower designs incorporating modified downstream walls 26. The illustrated system also contains a non-rotating external fluid guide 34, which is attached to bulkhead 15 and directs the repressurized filtered fluid 10 from pressurizing means 12 upstream toward interface area 20. The second method advantageously requires less energy to operate since it is repressurizing a smaller volume of filtered fluid 10.

Figure 6:
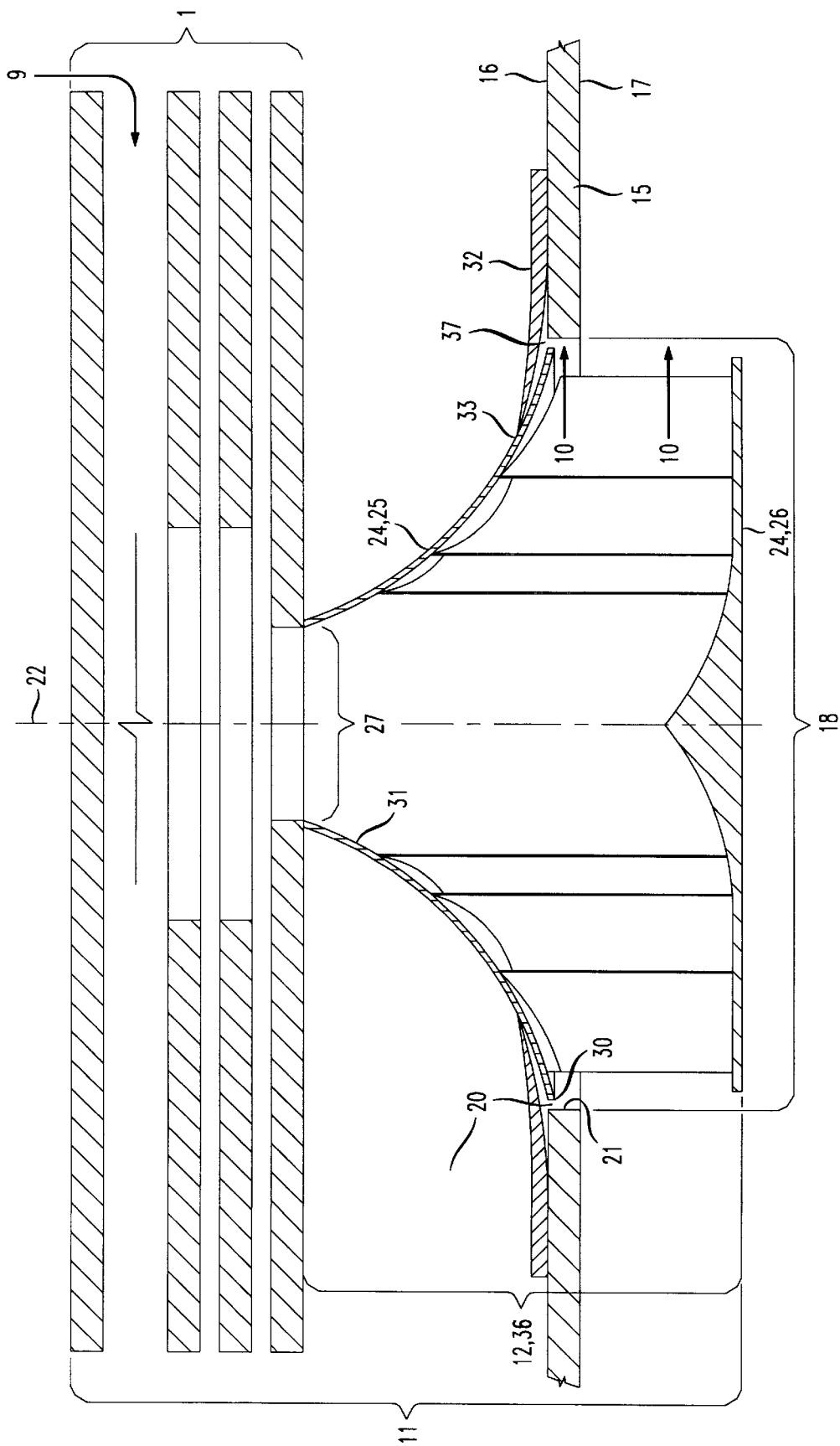
FIG. 6 is a cross section of a filtering apparatus utilizing an improved centrifugal blower design, additional sealing measures, and tunable pressure cavity, and illustrating a second alternate method of pressurizing the interface area.

In FIG. 6 there is shown an embodiment of the third method of interface area 20 pressurization, working in conjunction with the first method of pressurization of interface area 20. Specifically, an improved centrifugal blower 36 design and "tunable pressure cavity" arrangement is illustrated. In a "tunable pressure cavity" arrangement, a seal 32 is utilized and a rough cavity 37 is formed, bounded by seal 32, bulkhead 15, and filtering apparatus 11, and breached by the gap between inner surface 21 of bulkhead orifice 18 and filtering apparatus 11. The pressure experienced within cavity 37 can be "tuned" by modifying the configuration of inner surface 21 of the bulkhead orifice 18 and the position and configuration of downstream wall 26. Inner surface 21 of bulkhead orifice 18 may, for example, be flat, sloped, or textured, though it is to be understood that other configurations would also be acceptable. The third method generally, and the tunable pressure cavity arrangement specifically, advantageously reduce the repressurization of filtered fluid 10 required to achieve the desired pressure at interface area 20, thus decreasing energy requirements. A similar effect would be realized even without the utilization of seal 32. If seal 32 is not included, interface area 20 may be considered a "tunable pressure region," and the pressure experienced within the tunable pressure region could be modified by tuning the same parameters as in the tunable pressure cavity design.

The greater efficiencies experienced through the use of the second and third methods may be particularly advantageous when employed in passive applications of filtering apparatus 11. Passive applications are those in which the rotation of filtering apparatus 11 is a by-product of fluid flow through filtering apparatus 11, and no external power source is utilized by filtering apparatus 11 to produce the rotation. Active systems, alternatively, are those in which an external power source is relied upon to produce rotation of filtering apparatus 11. In active systems, the pressurizing means can be utilized to produce zero pressure loss through filtering apparatus 11, and can also be utilized to pressurize the entire system which the filtering apparatus 11 serves, thus eliminating the need for a separate pressurization or mass flow producing element, fan, pump, blower, or compressor. Though the application of the second and third methods are particularly advantageous in passive systems, it is to be understood that all methods may be utilized in active or passive systems.

Figure 7:
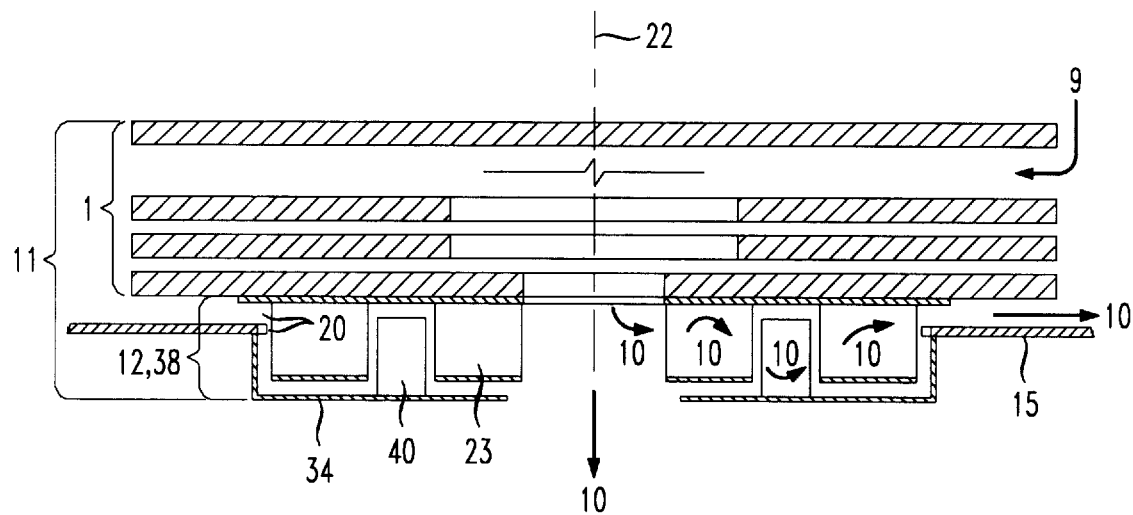
FIG. 7 illustrates the use of a multistage radial blower design for the filtering apparatus.
Figure 7:
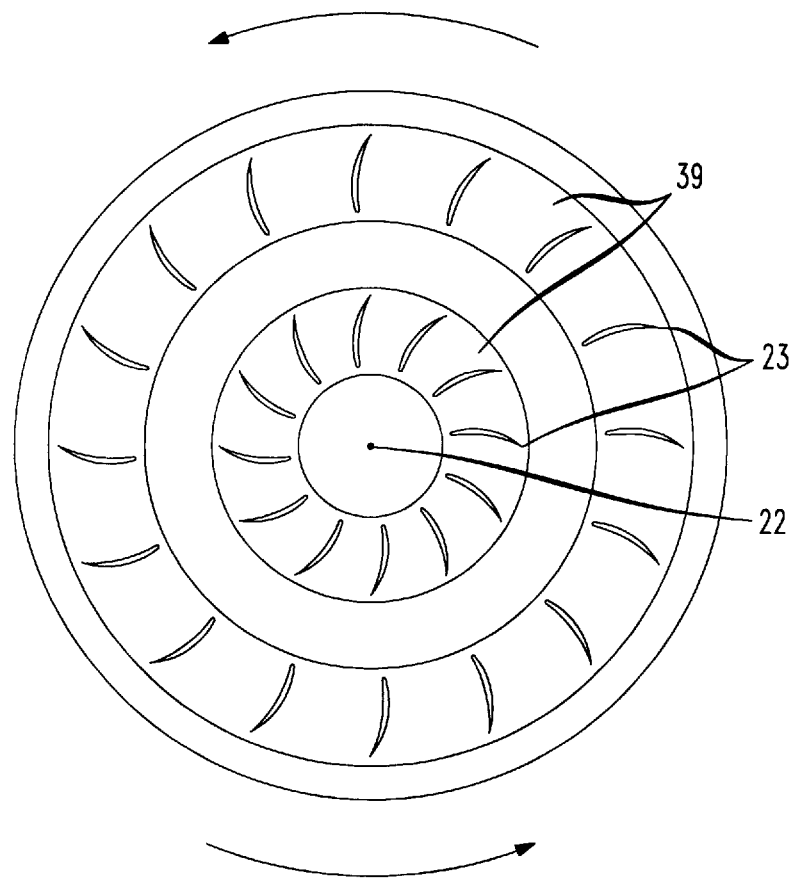
Figure 8:
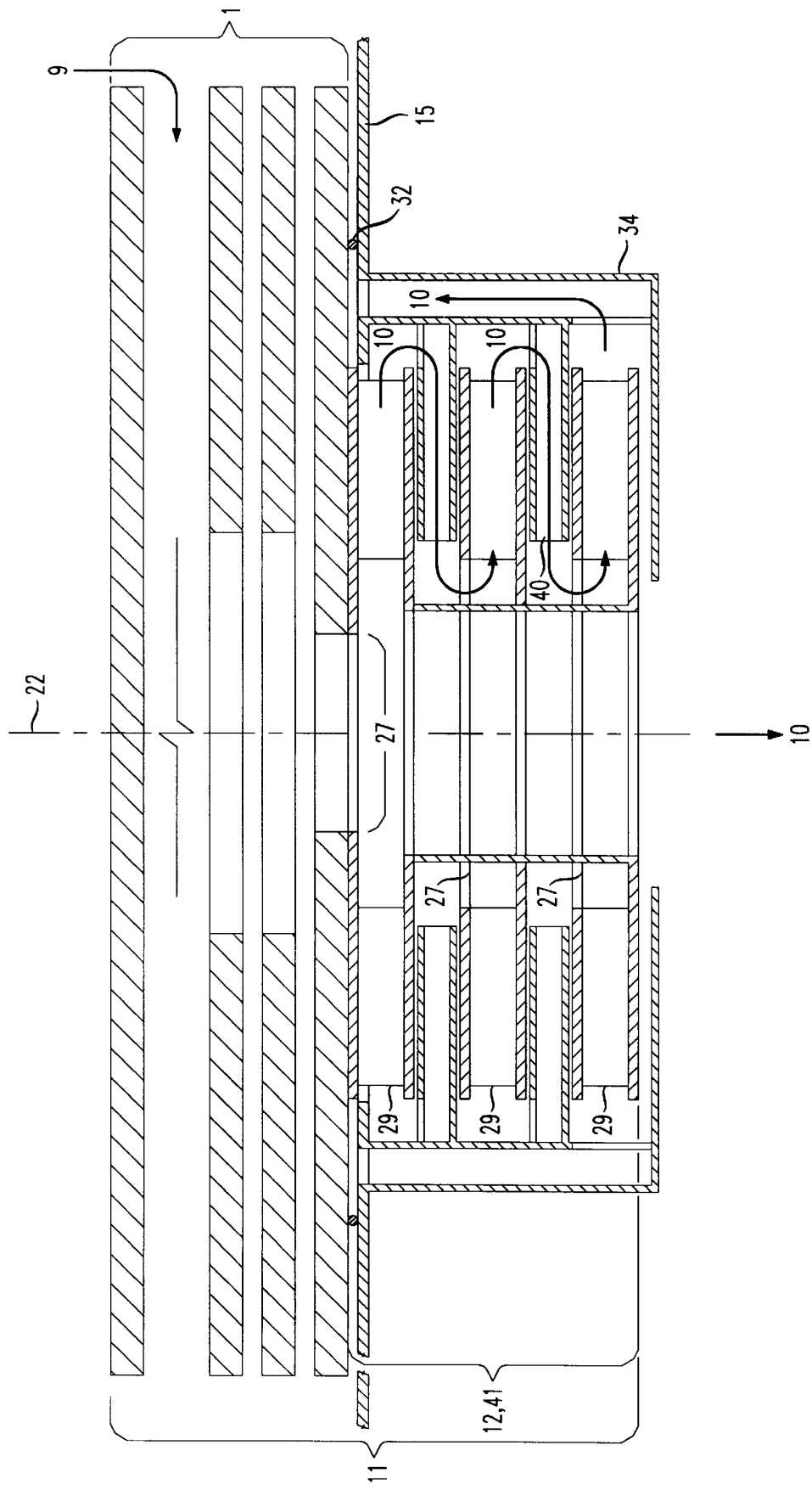
FIG. 8 illustrates the use of a multistage axial blower design for the filtering apparatus.

Another method which could prove particularly advantageous in passive systems is the use of multistage pressurization means. For example, a multistage radial blower design or a multistage axial blower design may be utilized. In FIG. 7 there is shown a multistage radial blower 38 design, in which the blower contains a plurality of vane sets 39, which form concentric rings of flow diverting vanes 23 around axis of rotation 22 of filtering apparatus 11. All flow diverting vanes 23 within a vane set 39 must be located within a range limited by a minimum distance from axis of rotation 22 and a maximum distance from axis of rotation 22. The area between the vane sets 39 contains rings of fixed cascading vanes 40 which do not rotate with filtering apparatus 11, and which serve to straighten the flow of filtered fluid 10 in preparation for the succeeding rotating vane set 39. In FIG. 8 there is shown a multistage axial blower 41 design, in which a plurality of centrifugal blowers are mounted coaxially downstream from exclusion filter 1. The discharged repressurized filtered fluid 10 from each centrifugal blower is channeled toward the blower orifice 27 of the next centrifugal blower downstream, until the discharge from the formal blower is channeled upstream to interface area 20. Though FIGS. 7 and 8 illustrate multistage centrifugal blower designs, it is to be understood that other pressurizing means could also utilize multistage designs, and that multistage designs may be utilized in active or passive systems, and in conjunction with any of the three previous methods.

The integrated exclusion filter and pressurizing system may be further modified by the addition of axial external vanes 42 or radial external vanes 43 to filtering apparatus 11. Advantageously, external vanes would disperse particles ejected by exclusion filter 1, thereby limiting accumulations of the ejected particles within the unfiltered fluid reservoir 13, and decreasing the particle density of unfiltered fluid 9 in the area surrounding exclusion filter 1. The external vanes could also be used to regulate the temperature of the system served by the filtering apparatus 11, such as an engine or turbine, by stimulating fluid flow across the exterior of the system. Finally, the external vanes could be used to stimulate fluid flow for use in diluting the exhaust of the system served by filtering apparatus 11, thereby advantageously limiting the temperature of the exhaust and reducing heat hazards. External vanes are mounted on the exterior of filtering apparatus 11 within unfiltered fluid reservoir 13.

Figure 9:
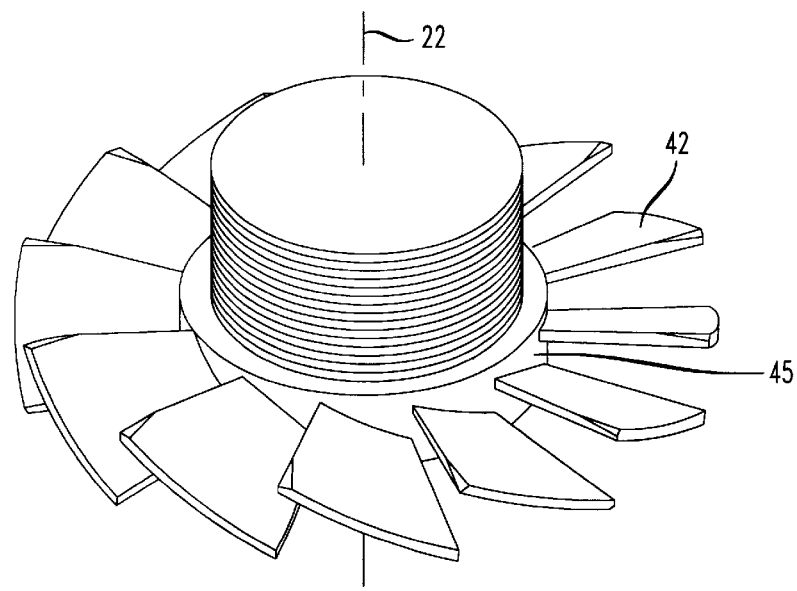
FIG. 9 illustrates one embodiment of the use of axial external vanes.
Figure 9:
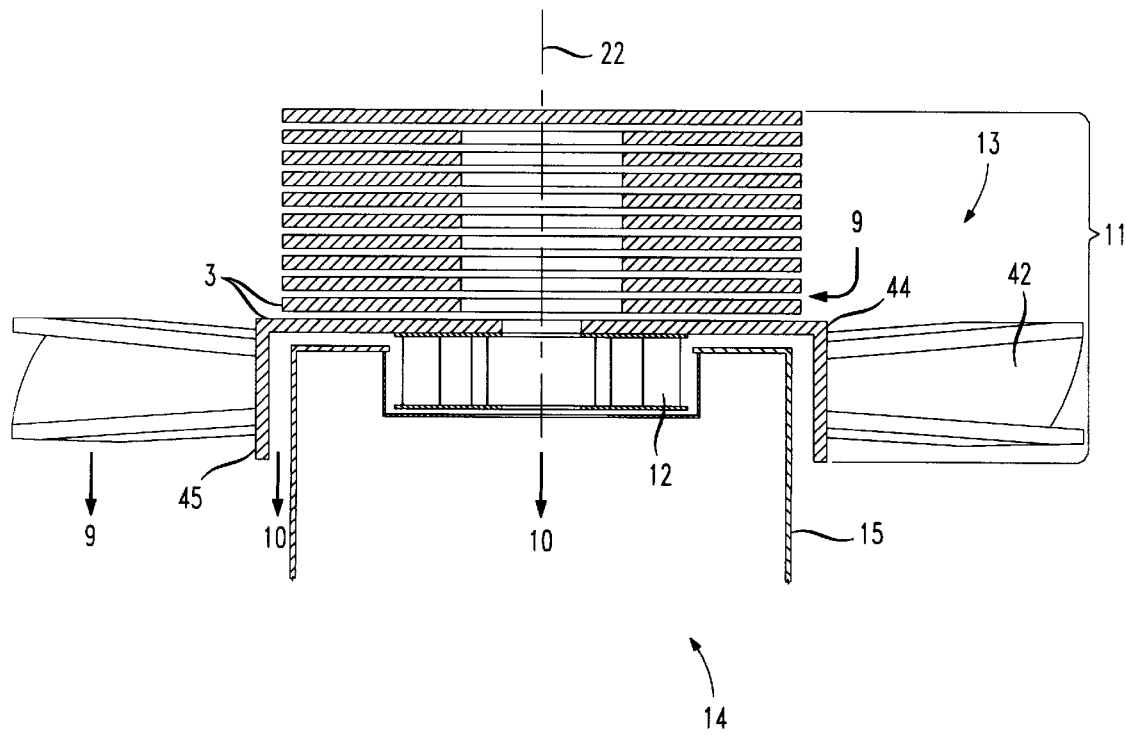

In FIG. 9 there is shown an axial external vane 42 arrangement, wherein the outer perimeter 44 of the flat annular disk 3 closest to pressurizing means 12 is extended away from the adjacent disk 3, thus forming a cylindrical surface 45. Axial external vanes 42 are mounted on cylindrical surface 45 and oriented to direct a flow of unfiltered fluid 9 parallel to axis of rotation 22 of filtering apparatus 11. It is to be understood that the design shown in FIG. 9 is but one example of acceptable axial external vane 42 design and arrangement, and that the axial external vanes 42 may also be mounted on other elements of the filtering apparatus 11 within unfiltered fluid reservoir 13, including separate elements added to filtering apparatus 11 for the purpose of mounting axial external vanes 42.

Figure 10:
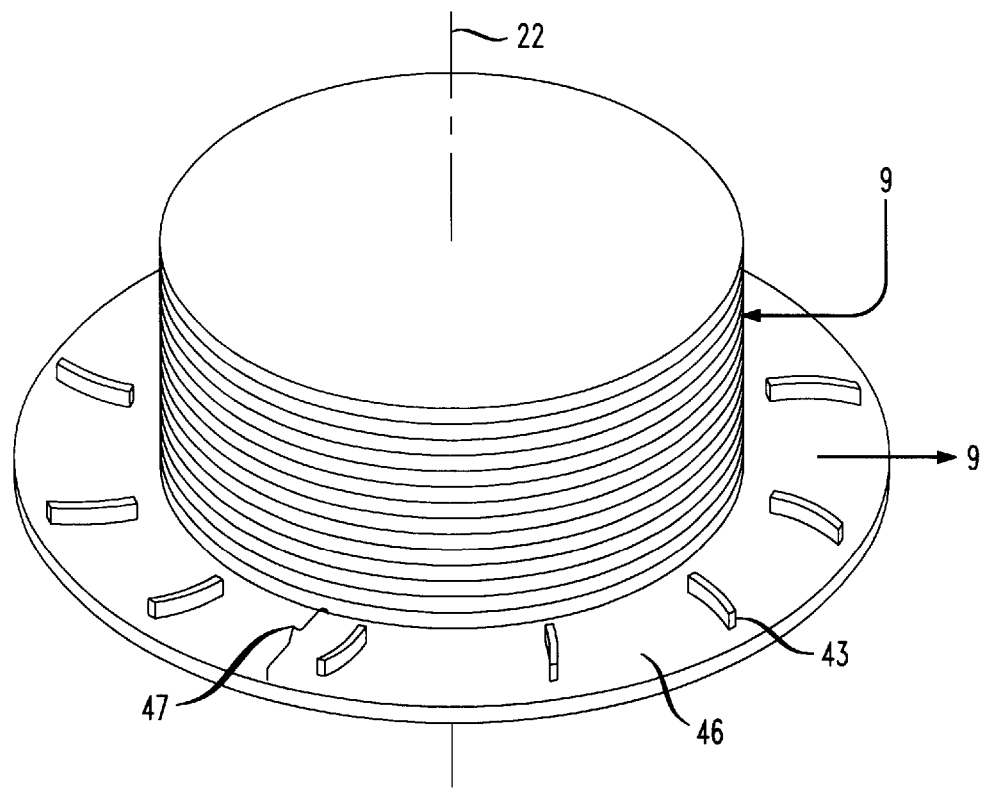
FIG. 10 illustrates one embodiment of the use of radial external vanes.
Figure 10:
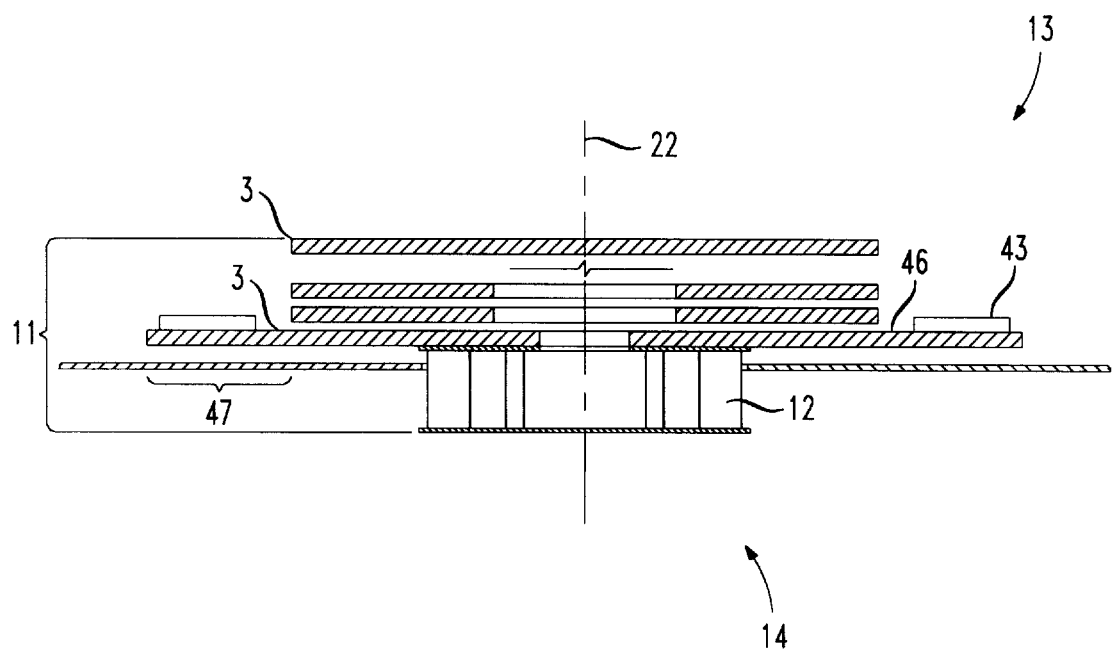

In FIG. 10 there is shown a radial external vane 43 arrangement, wherein the flat annular disk 3 closest to pressurizing means 12 is extended away from axis of rotation 22 of filtering apparatus 11, forming a disk extension 47. The radial external vanes 43 are mounted on the upstream surface 46 of disk extension 47 and oriented to direct unfiltered fluid 9 away from axis of rotation 22 of filtering apparatus 11. It is to be understood that the design shown in FIG. 10 is but one example of acceptable radial external vane 43 design and arrangement, and that the radial external vanes 43 may also be mounted on other elements of the filtering apparatus 11 within unfiltered fluid reservoir 13, including separate elements added to the filtering apparatus 11 for the purpose of mounting the radial external vanes 43.

Though FIGS. 3 through 10 illustrate embodiments of the current invention which utilize centrifugal blowers, it is to be understood that the variations of the current invention illustrated therein and described within the Detailed Description of the Invention may be practiced using other pressurizing means. It is also to be understood that the in the claimed invention the terms "pump", "fan", "turbine", and "compressor" are interchangeable with the term "centrifugal blower," and that the definition of "centrifugal blower" for the purposes of interpreting the claims expressly includes the alternate pressurizing means.

The integrated exclusion filter and pressurizing system, and many of its intended advantages, will be understood from the foregoing description and it will be apparent that, although the invention and its advantages have been described in detail, various changes, substitutions, and alterations may be made in the form, construction, and arrangement of the parts thereof without departing from the spirit and scope of the invention as defined by the appended claims, or sacrificing its material advantages, the form hereinbefore described being merely a preferred or exemplary embodiment thereof.

What is claimed is:

1. A filtering apparatus for removing particles from a fluid, the filtering apparatus comprising:

an exclusion filter, the exclusion filter interfacing a bulkhead which separates filtered material from unfiltered material, an interface area being disposed between the exclusion filter and the bulkhead, wherein axial outlet flow from the exclusion filter passes through the bulkhead, and downstream leakage preventing means, wherein axial outlet flow from the exclusion filter is repressurized and diverted toward the interface area, so that the interface area is pressurized by the repressurized and diverted filtered fluid to a pressure at least as great as the pressure on the upstream side of the interface area.

2. A filtering apparatus for removing particles from a fluid, the filtering apparatus comprising:

an exclusion filter, the exclusion filter interfacing a bulkhead which separates filtered material from unfiltered material, an interface area being disposed between the exclusion filter and the bulkhead, wherein axial outlet flow from the exclusion filter passes through the bulkhead, and pressurizing means for pressurizing the interface area between the exclusion filter and the bulkhead to a pressure at least as great as the pressure on the upstream side of the interface area, wherein axial outlet flow from the exclusion filter is repressurized and diverted to the interface area, so that the repressurized and diverted filtered fluid pressurizes the interface area and downstream leakage is prevented.

3. A filtering apparatus for removing particles from a fluid, the filtering apparatus comprising:

an exclusion filter, the exclusion filter interfacing a bulkhead which separates filtered material from unfiltered material, an interface area being disposed between the exclusion filter and the bulkhead, wherein axial outlet flow from the exclusion filter passes through the bulkhead, and flow diverting vanes rotatably mounted in a housing downstream from the exclusion filter, the housing having a downstream wall, the downstream wall being solid, so that the filtered fluid is repressurized by the vanes, ejected radially, and directed toward the interface area so that the repressurized and directed filtered fluid pressurizes the interface area and prevents downstream leakage.

4. The apparatus of claim 3, wherein the housing further has an upstream wall, the upstream wall containing an orifice for receiving filtered fluid from the exclusion filter, and the upstream wall being of a concave frusticone shape having a narrow end oriented toward the exclusion filter.

5. The apparatus of claim 3, wherein a centrifugal blower serves as the flow diverting vanes in a housing, the centrifugal blower being mounted co-axially with and downstream from the exclusion filter, having an upstream wall and a downstream wall, the upstream wall containing a blower orifice through which to receive filtered fluid from the exclusion filter, and the downstream wall being solid, so that the filtered fluid is repressurized by the blower, and ejected radially outward through the sides of the blower, wherein the bulkhead has a substantially cylindrical bulkhead orifice, the filtering apparatus passing through the center of the substantially circular bulkhead orifice, the axis of rotation of the filtering apparatus being substantially collinear with the central axis of the bulkhead orifice, the exclusion filter inlet spaces being located entirely on the upstream side of the bulkhead, the plane of the bulkhead orifice intersecting the filtering apparatus at a level intermediate of the exclusion filter inlet spaces and the outer perimeter of the downstream wall of the blower, and the diameter of the bulkhead orifice being only slightly larger than the diameter of the blower at the interface area.

6. The apparatus of claim 5, wherein the upstream wall is of a concave frusticone shape having a narrow end oriented toward the exclusion filter.

7. The apparatus of claim 3, wherein axial external vanes are added to the filtering apparatus, the axial external vanes being mounted on the exterior of the filtering apparatus and upstream of the bulkhead.

8. The apparatus of claim 7, wherein the outermost edge of the exclusion filter disk most near the bulkhead is extended away from the adjacent disk, thus forming a cylindrical surface, and wherein the axial external vanes are mounted on the cylindrical surface and oriented to direct a flow of unfiltered fluid parallel to the axis or rotation of the filtering apparatus.

9. The apparatus of claim 3, wherein radial external vanes are added to the filtering apparatus, the radial external vanes being mounted on the exterior of the filtering apparatus and upstream of the bulkhead.

10. The apparatus of claim 9, wherein the exclusion filter disk most near the bulkhead is extended away from the axis of rotation of the filtering apparatus, and wherein the radial external blades are mounted on the extension of the exclusion filter disk and oriented to direct unfiltered fluid away from the axis of rotation if the filtering apparatus.

11. A filtering apparatus for removing particles from a fluid, the filtering apparatus comprising:

an exclusion filter, the exclusion filter interfacing a bulkhead which separates filtered material from unfiltered material, an interface area being disposed between the exclusion filter and the bulkhead, wherein axial outlet flow from the exclusion filter passes through the bulkhead, and flow diverting vanes rotatably mounted in a housing downstream from the exclusion filter, the housing having a downstream wall, the downstream wall containing a outlet orifice, so that a fraction of the filtered fluid is repressurized by the vanes, ejected radially, and directed toward the interface area by a non-rotating fluid guide so that the repressurized and directed filtered fluid pressurizes the interface area, and the remainder of the filtered fluid passes through the outlet orifice.

12. The apparatus of claim 11, wherein the housing further has an upstream wall, the upstream wall containing an orifice for receiving filtered fluid from the exclusion filter, and the upstream wall being of a concave frusticone shape having a narrow end oriented toward the exclusion filter.

13. The apparatus of claim 11, wherein a centrifugal blower serves as the flow diverting vanes in a housing, the centrifugal blower being mounted co-axially with and downstream from the exclusion filter, having an upstream wall and a downstream wall, the upstream wall containing a blower orifice through which to receive filtered fluid from the exclusion filter, and the downstream wall containing an outlet orifice, so that a fraction of the filtered fluid is repressurized by the blower and ejected radially outward through the sides of the blower, and the remainder of the filtered fluid passes through the outlet orifice, wherein the bulkhead has a substantially cylindrical bulkhead orifice, the filtering apparatus passing through the center of the substantially circular bulkhead orifice, the axis of rotation of the filtering apparatus being substantially collinear with the central axis of the bulkhead orifice, the exclusion filter inlet spaces being located entirely on the upstream side of the bulkhead, the plane of the bulkhead orifice intersecting the filtering apparatus at a level intermediate of the exclusion filter inlet spaces and the outer perimeter of the downstream wall of the blower, and the diameter of the bulkhead orifice being only slightly larger than the diameter of the blower at the interface area.

14. The apparatus of claim 13, wherein the upstream wall is of a concave frusticone shape having a narrow end oriented toward the exclusion filter.

15. The apparatus of claim 13, wherein a multistage axial centrifugal blower design is utilized, the blower design including a plurality of centrifugal blowers mounted co-axially downstream of the exclusion filter, the initial blower repressurizing a fraction of the filtered fluid discharged from the exclusion filter, the output from each successive blower being channeled to the blower orifice of the next blower downstream, the discharged repressurized filtered fluid from the final centrifugal blower being directed toward the interface area, and the remainder of the filtered fluid not repressurized by the initial blower passing through orifices in the successive blowers without repressurization.

16. The apparatus of claim 13, wherein a multistage radial centrifugal blower design is utilized, the blower design including a plurality of vane sets, each vane set containing a plurality of vanes, the vane sets forming concentric rings about the axis of rotation of the filtering apparatus, the location of the vanes of each vane set being limited by an inner distance from the center of rotation and an outer distance from the center of rotation, the distance between adjacent vane sets containing a set of fixed cascading vanes that do not rotate with the filtering apparatus, the output from the outermost vane set being directed toward the interface area between the filtering apparatus and the bulkhead.

17. The apparatus of claim 11, wherein axial external vanes are added to the filtering apparatus, the axial external vanes being mounted on the exterior of the filtering apparatus and upstream of the bullhead.

18. The apparatus of claim 17, wherein the outermost edge of the exclusion filter disk most near the bulkhead is extended away from the adjacent disk, thus forming a cylindrical surface, and wherein the axial external vanes are mounted on the cylindrical surface and oriented to direct a flow of unfiltered fluid parallel to the axis or rotation of the filtering apparatus.

19. The apparatus of claim 11, wherein radial external vanes are added to the filtering apparatus, the radial external vanes being mounted on the exterior of the filtering apparatus and upstream of the bulkhead.

20. The apparatus of claim 19, wherein the exclusion filter disk most near the bulkhead is extended away from the axis of rotation of the filtering apparatus, and wherein the radial external blades are mounted on the extension of the exclusion filter disk and oriented to direct unfiltered fluid away from the axis of rotation if the filtering apparatus.

21. In an exclusion filter of the type wherein a cylindrical stack of a plurality of evenly-spaced annular disks rotates about the cylindrical stack's central axis, the annular disks being substantially flat and having concentric holes, the annular disks' concentric holes forming a central core, the cylindrical stack having a capped end and an orifice end and having inlet spaces between the annular disks, in which unfiltered fluid enters the cylindrical stack's periphery through the inlet spaces and filtered fluid exits the cylindrical stack through the orifice end via the central core, and in which the exclusion filter interfaces a bulkhead which separates the unfiltered fluid from the filtered fluid, an interface area being disposed between the exclusion filter and the bulkhead, wherein the improvement comprises:

the addition of pressurizing means for pressurizing the interface area between the filtering apparatus and the bulkhead to a pressure at least as great as the pressure on the upstream side of the interface area, wherein axial outlet flow from the exclusion filter is repressurized and diverted to the interface area, so that the repressurized and diverted filtered fluid pressurizes the interface area and downstream leakage is prevented.

22. In an exclusion filter of the type wherein a cylindrical stack of a plurality of evenly-spaced annular disks rotates about the cylindrical stack's central axis, the annular disks being substantially flat and having concentric holes, the annular disks' concentric holes forming a central core, the cylindrical stack having a capped end and an orifice end and having inlet spaces between the annular disks, in which unfiltered fluid enters the cylindrical stack's periphery through the inlet spaces and filtered fluid exits the cylindrical stack through the orifice end via the central core, and in which the exclusion filter interfaces a bulkhead which separates the unfiltered fluid from the filtered fluid, an interface area being disposed between the exclusion filter and the bulkhead, wherein the improvement comprises:

the addition of flow diverting vanes rotatably mounted in a housing downstream from the exclusion filter, the downstream side of the housing being solid, so that the filtered fluid is repressurized by the vanes, ejected radially, and directed toward the interface area so that the reressurized and directed filtered fluid pressurizes the interface area and prevents downstream leakage.

23. The apparatus of claim 22, wherein the housing further has an upstream wall, the upstream wall containing an orifice for receiving filtered fluid from the exclusion filter, and the upstream wall being of a concave frusticone shape having a narrow end oriented toward the exclusion filter.

24. The apparatus of claim 22, wherein a centrifugal blower serves as the flow diverting vanes in a housing, the centrifugal blower being mounted co-axially with and downstream from the exclusion filter, having an upstream wall and a downstream wall, the upstream wall containing a blower orifice through which to receive filtered fluid from the exclusion filter, and the downstream wall being solid, so that the filtered fluid is repressurized by the blower and ejected radially outward through the sides of the blower, wherein the bulkhead has a substantially cylindrical bulkhead orifice, the filtering apparatus passing through the center of the substantially circular bulkhead orifice, the axis of rotation of the filtering apparatus being substantially collinear with the central axis of the bulkhead orifice, the exclusion filter inlet spaces being located entirely on the upstream side of the bulkhead, the plane of the bulkhead orifice intersecting the filtering apparatus at a level intermediate of the exclusion filter inlet spaces and the outer perimeter of the downstream wall of the blower, and the diameter of the bulkhead orifice being only slightly larger than the diameter of the blower at the interface area.

25. The apparatus of claim 24, wherein the upstream wall is of a concave frusticone shape having a narrow end oriented toward the exclusion filter.

26. The apparatus of claim 22, wherein axial external vanes are added to the filtering apparatus, the axial external vanes being mounted on the exterior of the filtering apparatus and upstream of the bulkhead.

27. The apparatus of claim 26, wherein the outermost edge of the exclusion filter disk most near the bulkhead is extended away from the adjacent disk, thus forming a cylindrical surface, and wherein the axial external vanes are mounted on the cylindrical surface and oriented to direct a flow of unfiltered fluid parallel to the axis or rotation of the filtering apparatus.

28. The apparatus of claim 22, wherein radial external vanes are added to the filtering apparatus, the radial external vanes being mounted on the exterior of the filtering apparatus and upstream of the bulkhead.

29. The apparatus of claim 28, wherein the exclusion filter disk most near the bulkhead is extended away from the axis of rotation of the filtering apparatus, and wherein the radial external blades are mounted on the extension of the exclusion filter disk and oriented to direct unfiltered fluid away from the axis of rotation if the filtering apparatus.

30. In an exclusion filter of the type wherein a cylindrical stack of a plurality of evenly-spaced annular disks rotates about the cylindrical stack's central axis, the annular disks being substantially flat and having concentric holes, the annular disks' concentric holes forming a central core, the cylindrical stack having a capped end and an orifice end and having inlet spaces between the annular disks, in which unfiltered fluid enters the cylindrical stack's periphery trough the inlet spaces and filtered fluid exits the cylindrical stack through the orifice end via the central core, and in which the exclusion filter interfaces a bulkhead which separates the unfiltered fluid from the filtered fluid, an interface area being disposed between the exclusion filter and the bulkhead, wherein the improvement comprises:

the addition of flow diverting vanes rotatable mounted in a housing downstream from the exclusion filter, the housing having a downstream wall containing an outlet orifice, so that a fraction of the filtered fluid is repressurized by the vanes, ejected radially, and directed toward the interface area by a non-rotating fluid guide and directed toward the interface area by a non-rotating fluid guide so that the repressurized and directed filtered fluid pressurizes the interface area, and the remainder of the filtered fluid passes through the outlet orifice.

31. The apparatus of claim 30, wherein the housing further has an upstream wall, the upstream wall containing an orifice for receiving filtered fluid from the exclusion filter, and the upstream wall being of a concave frusticone shape having a narrow end oriented toward the exclusion filter.

32. The apparatus of claim 30, wherein a centrifugal blower serves as the flow diverting vanes in a housing, the centrifugal blower being mounted co-axially with and downstream from the exclusion filter, having an upstream wall and a downstream wall, the upstream wall containing a blower orifice through which to receive filtered fluid from the exclusion filter, and the downstream wall containing an outlet orifice, so that a fraction of the filtered fluid is repressurized by the blower and ejected radially outward through the sides of the blower, and the remainder of the filtered fluid passes through the outlet orifice, wherein the bulkhead has a substantially cylindrical bulkhead orifice, the filtering apparatus passing through the center of the substantially circular bulkhead orifice, the axis of rotation of the filtering apparatus being substantially collinear with the central axis of the bulkhead orifice, the exclusion filter inlet spaces being located entirely on the upstream side of the bulkhead, the plane of the bulkhead orifice intersecting the filtering apparatus at a level intermediate of the exclusion filter inlet spaces and the outer perimeter of the downstream wall of the blower, and the diameter of the bulkhead orifice being only slightly larger than the diameter of the blower at the interface area.

33. The apparatus of claim 32, wherein the upstream wall is of a concave frusticone shape having a narrow end oriented toward the exclusion filter.

34. The apparatus of claim 32, wherein a multistage axial centrifugal blower design is utilized, the blower design including a plurality of centrifugal blowers mounted co-axially downstream of the exclusion filter, the initial blower repressurizing a fraction of the filtered fluid discharged from the exclusion filter, the output from each successive blower being channeled to the blower orifice of the next blower downstream, the discharged repressurized filtered fluid from the final centrifugal blower being directed toward the interface area, and the remainder of the filtered fluid not repressurized by the initial blower passing through orifices in the successive blowers without repressurization.

35. The apparatus of claim 32, wherein a multistage radial centrifugal blower design is utilized, the blower design including a plurality of vane sets, each vane set containing a plurality of vanes, the vane sets forming concentric rings about the axis of rotation of the filtering apparatus, the location of the vanes of each vane set being limited by an inner distance from the center of rotation and an outer distance from the center of rotation, the distance between adjacent vane sets containing a set of fixed cascading vanes that do not rotate with the filtering apparatus, the output from the outermost vane set being directed toward the interface area between the filtering apparatus and the bulkhead.

36. The apparatus of claim 30, wherein axial external vanes are added to the filtering apparatus, the axial external vanes being mounted on the exterior of the filtering apparatus and upstream of the bulkhead.

37. The apparatus of claim 36, wherein the outermost edge of the exclusion filter disk most near the bulkhead is extended away from the adjacent disk, thus forming a cylindrical surface, and wherein the axial external vanes are mounted on the cylindrical surface and oriented to direct a flow of unfiltered fluid parallel to the axis or rotation of the filtering apparatus.

38. The apparatus of claim 30, wherein radial external vanes are added to the filtering apparatus, the radial external vanes being mounted on the exterior of the filtering apparatus and upstream of the bulkhead.

39. The apparatus of claim 38, wherein the exclusion filter disk most near the bulkhead is extended away from the axis of rotation of the filtering apparatus, and wherein the radial external blades are mounted on the extension of the exclusion filter disk and oriented to direct unfiltered fluid away from the axis of rotation if the filtering apparatus.

40. A process for preventing downstream leakage at an interface area between a bulkhead and a filtering apparatus, the filtering apparatus containing an exclusion filter, the bulkhead separating filtered fluid from unfiltered fluid and containing a bulkhead orifice through which the exclusion filter passes, the bulkhead orifice having an inner surface, the process comprising:

repressurizing the axial outlet flow of filtered fluid from the exclusion filter, directing the repressurized filtered fluid toward the interface area, and pressurizing the interface area with the repressurized directed filtered fluid to a pressure not less than the pressure on the upstream side of the interface area.

41. The process of claim 40, the process further comprising directing a fraction of the repressurized filtered fluid toward the inner surface of the bulkhead orifice, thereby creating a stagnation region and aiding the pressurization of the interface area.

42. A process for preventing downstream leakage at an interface area between a bulkhead and a filtering apparatus, the filtering apparatus containing an exclusion filter, the bulkhead separating filtered fluid from unfiltered fluid and containing a bulkhead orifice through which the exclusion filter passes, the bulkhead orifice having an inner surface, the process comprising:

repressurizing a fraction of the axial outlet flow of filtered fluid from the exclusion filter, directing the repressurized filtered fluid toward the interface area, and pressurizing the interface area with the repressurized directed filtered fluid to a pressure not less than the pressure on the upstream side of the interface area.

43. The process of claim 42, the process further comprising directing a fraction of the repressurized filtered fluid toward the inner surface of the bulkhead orifice, thereby creating a stagnation region and aiding the pressurization of the interface area.

\* \* \* \* \*